(12) United States Patent
Schmidt

(10) Patent No.: US 9,984,501 B2
(45) Date of Patent: May 29, 2018

(54) ADAPTIVELY MERGING INTERSECTING MESHES

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 417 days.

(21) Appl. No.: 13/893,198

(22) Filed: May 13, 2013

(65) Prior Publication Data

US 2013/0300736 A1 Nov. 14, 2013

Related U.S. Application Data

(60) Provisional application No. 61/646,603, filed on May 14, 2012.

(51) Int. Cl.
G06T 17/20 (2006.01)
G06T 19/20 (2011.01)

(52) U.S. Cl.
CPC .............. *G06T 17/20* (2013.01); *G06T 19/20* (2013.01)

(58) Field of Classification Search
CPC ................................. G06T 17/20; G06T 19/20
See application file for complete search history.

(56) References Cited

U.S. PATENT DOCUMENTS

| 5,886,702 A | 3/1999 | Migdal et al. |
| 6,169,549 B1 | 1/2001 | Burr |
| 6,256,039 B1 | 7/2001 | Krishnamurthy |
| 6,693,631 B2 | 2/2004 | Hubeli et al. |
| 7,228,191 B2 | 6/2007 | Hofmeister et al. |
| 2001/0013866 A1 | 8/2001 | Migdal et al. |
| 2006/0290693 A1 | 12/2006 | Zhou et al. |
| 2006/0290695 A1* | 12/2006 | Salomie .................. G06T 17/20 345/420 |

(Continued)

OTHER PUBLICATIONS

Rocchini et al., The Marching Intersections algorithm for merging range images, Mar. 4, 2004, The Visual Computer (2004) 20:149-164, pp. 149-164.*

(Continued)

*Primary Examiner* — Yuehan Wang
(74) *Attorney, Agent, or Firm* — Artegis Law Group, LLP

(57) ABSTRACT

One embodiment of the present invention sets forth a technique for merging intersecting meshes of primitives. The technique involves determining an intersection boundary that is defined by an intersection between a first mesh of primitives and a second mesh of primitives. The technique further involves determining that a first plurality of primitives included in the first mesh of primitives and a second plurality of primitives included in the second mesh of primitives are proximate to the intersection boundary. The technique further involves removing the first plurality of primitives to form a first mesh boundary associated with the first mesh and removing the second plurality of primitives to form a second mesh boundary associated with the second mesh. Finally, the technique involves connecting a first plurality of vertices associated with the first mesh boundary to a second plurality of vertices associated with the second mesh boundary to form a joined boundary.

21 Claims, 13 Drawing Sheets

(6 of 13 Drawing Sheet(s) Filed in Color)

(56) References Cited

U.S. PATENT DOCUMENTS

| | | |
|---|---|---|
| 2007/0165025 A1 | 7/2007 | Shen et al. |
| 2009/0177454 A1 | 7/2009 | Bronstein |
| 2010/0226589 A1 | 9/2010 | Mukherjee |
| 2011/0050691 A1 | 3/2011 | Hamedi et al. |
| 2012/0120074 A1 | 5/2012 | Huysmans et al. |
| 2012/0215510 A1 | 8/2012 | Metaxas |

OTHER PUBLICATIONS

Turk et al., Zippered Polygon Meshes from Range Images, 1994, ACM 1994 ISBN: 0-89791-667-0, pp. 1-8.*
Bloomenthal et al., Polygonization of Non-Manifold Implicit Surfaces, 1995, Siggraph '95 Proceeding of the 22nd annual conference on Computer Graphic and interactive techniques, pp. 309-316.*
André, Lecture 7—Meshing, 2006, Fluent Inc., p. 1-35.*
Brochu et al, "Efficient Geometrically Exact Continuous Collison Detection", ACM Transactions on Graphics (TOG), vol. 31 No. 4, dated Jul. 1, 2012, New York, US.
Menci et al. Improved Laplacian Smoothing of Noisy Surface Meshes, 1999, Eurographics, vol. 18 (1999), No. 3, pp. 1-8.
Non-Final Office Action for U.S. Appl. No. 13/893,196, dated Jul. 28, 2015, 16 pages.
Non-Final Office Action for U.S. Appl. No. 13/893,191, dated Jul. 7, 2015, 39 pages.
Non-Final Office Action for U.S. Appl. No. 13/893,194, dated Aug. 20, 2015, 19 pages.
Non-Final Office Action for U.S. Appl. No. 13/893,194, dated Oct. 12, 2016, 22 pages.
Sharf et al., SnapPaste: An Interactive Technique for easy Mesh Composition, Aug. 25, 2006, Visual Comput (2006) 22:835-844.
Non-Final Office Action for U.S. Appl. No. 13/892,750, dated May 4, 2015, 17 pages.
Non-Final Office Action for U.S. Appl. No. 13/892,750, dated Sep. 6, 2016, 19 pages.

* cited by examiner

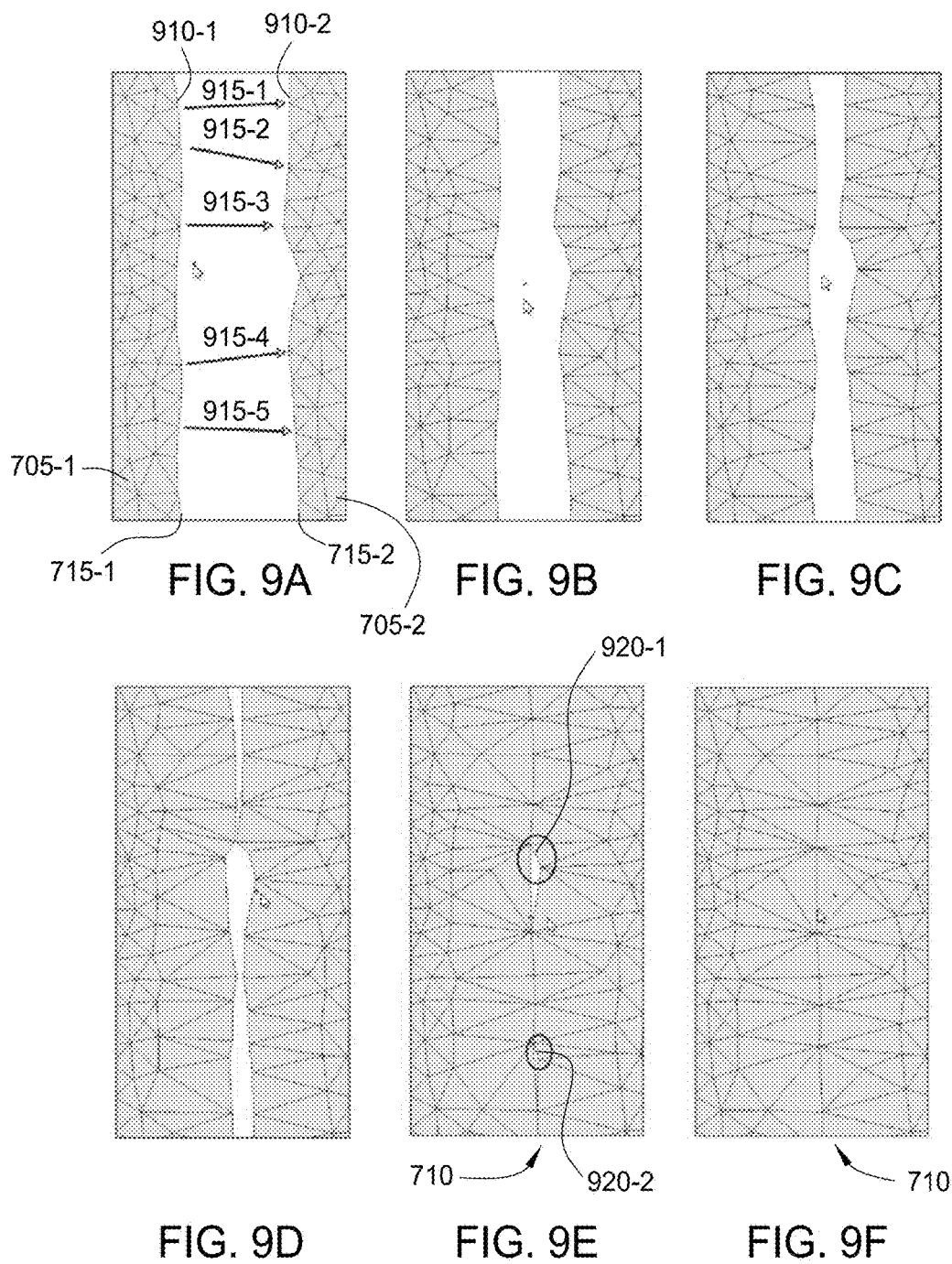

ADAPTIVELY MERGING INTERSECTING MESHES

CROSS-REFERENCE TO RELATED APPLICATIONS

This application claims benefit of U.S. Provisional Patent Application Ser. No. 61/646,603, filed May 14, 2012, which is herein incorporated by reference in its entirety.

BACKGROUND OF THE INVENTION

Field of the Invention

Embodiments of the present invention generally relate to computer-aided design (CAD) and, more specifically, to techniques for adaptively merging intersecting meshes.

Description of the Related Art

A wide variety of software applications are currently available to end-users, including computer-aided design (CAD) applications, computer graphics applications, and three-dimensional (3D) modeling applications, among others. Many of these software applications allow an end-user to create and modify 2D and/or 3D designs. For example, an end-user may interact with a 3D modeling application to add geometry to a design, remove geometry from a design, extrude portions of the design, or join two or more designs. Such operations typically are performed by modifying a mesh of primitives (e.g., triangles) associated with the design.

In conventional software applications, merging two meshes typically requires the end-user to painstakingly prepare and modify each mesh. For example, merging two meshes may require the end-user to manually prepare the mesh boundaries at which the meshes are to be merged such that each vertex on the boundary of the first mesh matches up with a vertex on the boundary of the second mesh. Consequently, conventional software applications typically are unable to produce satisfactory results when attempting to merge meshes having different resolutions (e.g., different vertex/triangle densities). Additionally, even when processing meshes having similar resolutions, conventional software applications introduce significant mesh distortions and irregularities during the merging process. Such irregularities may produce numerical and computational issues and/or produce visual artifacts during subsequent processing of the mesh. Moreover, repairing mesh triangles affected by the merging process can be tedious and time-consuming for the end-user.

As the foregoing illustrates, there is a need in the art for a more effective way to enable application end-users to merge different meshes of primitives.

SUMMARY OF THE INVENTION

One embodiment of the present invention sets forth a method for merging intersecting meshes of primitives. The method involves determining an intersection boundary that is defined by an intersection between a first mesh of primitives and a second mesh of primitives. The method further involves determining that a first plurality of primitives included in the first mesh of primitives are proximate to the intersection boundary and determining that a second plurality of primitives included in the second mesh of primitives are proximate to the intersection boundary. The method further involves removing the first plurality of primitives to form a first mesh boundary associated with the first mesh of primitives and removing the second plurality of primitives to form a second mesh boundary associated with the second mesh of primitives. Finally, the method involves connecting a first plurality of vertices associated with the first mesh boundary to a second plurality of vertices associated with the second mesh boundary to form a joined boundary.

Further embodiments provide a non-transitory computer-readable medium and a computing device to carry out at least the method steps set forth above.

Advantageously, the disclosed technique allows a user to merge intersecting meshes in a manner that does not result in significant mesh distortions or irregularities. A boundary at which the meshes intersect is determined, and unwanted portions of each mesh surface (e.g., mesh portions inside of the intersection boundary) are removed. A zippering algorithm may then be applied in an iterative manner to connect vertices associated with one mesh to vertices associated with the other mesh. The disclosed technique, among other things, enables intersecting meshes having similar or dissimilar triangle and vertex densities to be efficiently merged with relatively little preparation.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

FIGS. 9A-9F illustrate a series of zippering iterations performed on mesh boundaries by the mesh zippering engine, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
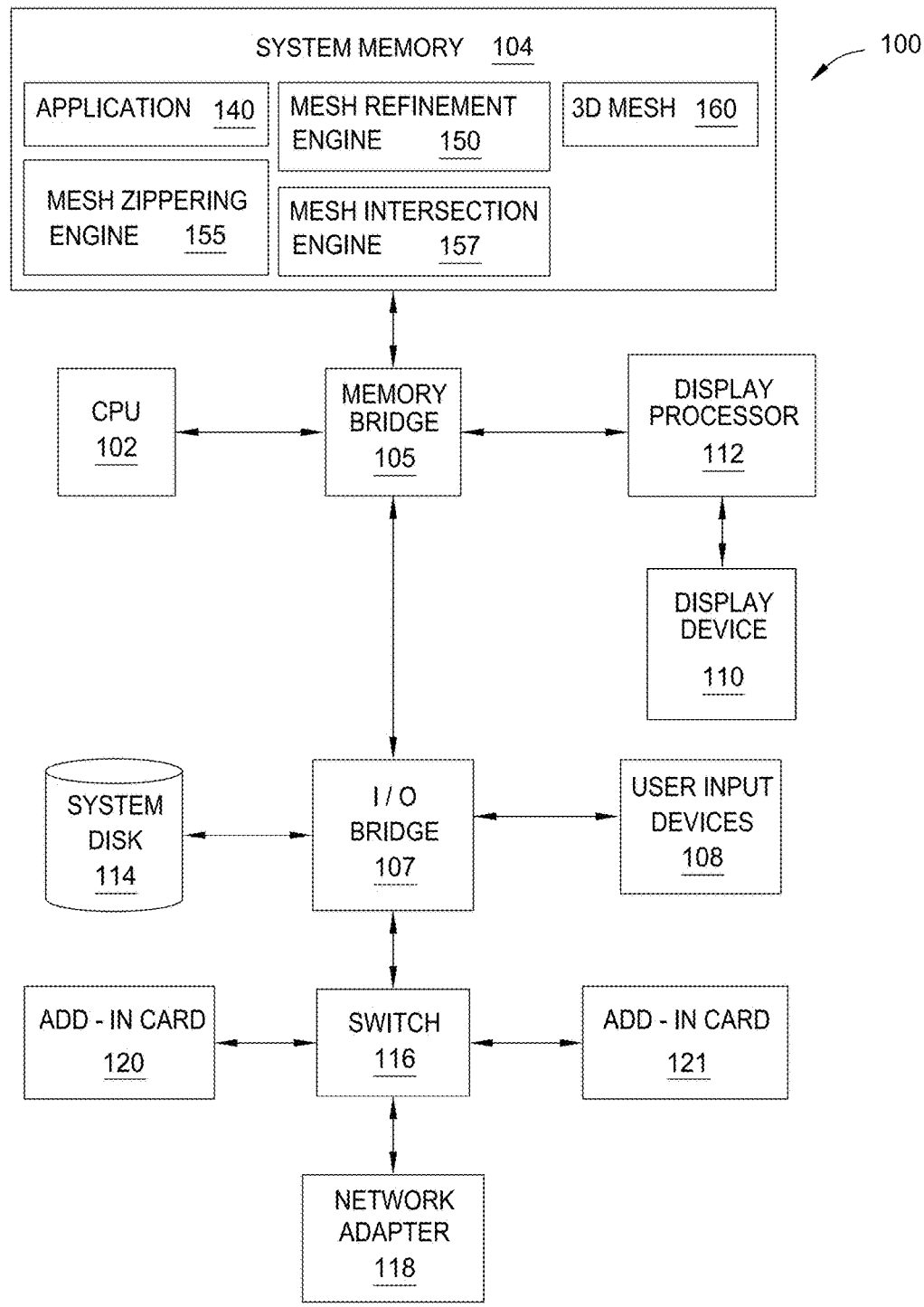
FIG. 1 illustrates a computing device configured to implement one or more aspects of the present invention.

FIG. 1 illustrates a computing device 100 configured to implement one or more aspects of the present invention. As shown, computing device 100 includes a memory bridge 105 that connects a central processing unit (CPU) 102, an input/output (I/O) bridge 107, a system memory 104, and a display processor 112.

Computing device 100 may be a computer workstation, a personal computer, video game console, personal digital assistant, mobile phone, mobile device or any other device suitable for practicing one or more embodiments of the present invention. As shown, the central processing unit (CPU) 102 and the system memory 104 communicate via a bus path that may include a memory bridge 105. CPU 102 includes one or more processing cores, and, in operation, CPU 102 is the master processor of computing device 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., conventional cathode ray tube, liquid crystal display, light-emitting diode, plasma, organic light-emitting diode, or surface-conduction electron-emitter based display). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network and may include wired or wireless communication over local area networks and wide area networks, such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport; or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (CPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

In one embodiment, application 140, mesh refinement engine 150, a mesh zippering engine 155, a mesh intersection engine 157, and 3D mesh 160 are stored in system memory 104. Although FIG. 1 shows the mesh refinement engine 150, mesh zippering engine 155, and mesh intersection engine 157 as separate software modules, the mesh refinement engine 150, mesh zippering engine 155, and mesh intersection engine 157 may be part of the same software executable. Additionally, the mesh refinement engine 150, mesh zippering engine 155, and mesh intersection engine 157 may be integrated into the application 140 or offered as software add-ons or plug-ins for the application 140. Application 140 may be a CAD (computer aided design) application program configured to generate and display graphics data included in the 3D mesh 160 on display device 110. For example, the 3D mesh 160 could define one or more graphics objects that represent a 3D model designed using the CAD system or a character for an animation application program.

The mesh refinement engine 150 is configured to modify a mesh (e.g., 3D mesh 160) by performing one or more refinement operations on the mesh. The refinement operations may be applied to add, remove, replace, shift, etc. vertices and/or edges included in the mesh. For example, an edge operation may be performed on the mesh to add an edge (e.g., a triangle edge) to the mesh, remove an edge from the mesh, and/or shift the position of an edge in the mesh. Additionally, a vertex operation may be performed to add a vertex to the mesh, remove a vertex from the mesh, and/or shift the position of a vertex in the mesh. Other types of refinement operations, such as smoothing operations, also may be performed to improve the visual appearance of a mesh.

The mesh refinement engine 150 enables a user to iteratively refine a mesh, for example, by repairing mesh distortions produced when adding geometry to a mesh, removing geometry from a mesh, modifying the geometry of a mesh, and the like. For example, merging regions of a mesh may distort the mesh, producing mesh triangles having irregular sizes and angles near the merged regions. Such irregularities may produce computational issues and/or visual artifacts during subsequent processing of the mesh. However, by performing mesh refinement operations before, during, and/or after the merging process, mesh distortions may be reduced or eliminated.

The mesh intersection engine 157 is configured to determine an intersection boundary defined by one or more intersections (e.g., intersecting points, intersecting lines, intersecting curves, intersecting planes, etc.) between a first mesh of primitives and a second mesh of primitives. The mesh intersection engine 157 is further configured to remove primitives associated with the first mesh and/or second mesh that are proximate to the intersection boundary to form a first mesh boundary and a second mesh boundary, respectively. Additionally, the mesh intersection engine 157 may remove other unwanted primitives associated with intersecting portions of the first mesh and/or second mesh (e.g., mesh primitives that are disposed in an interior volume of the first mesh and/or second mesh).

After the mesh intersection engine 157 removes primitives proximate to the intersection boundary, the mesh zippering engine 155 is configured to merge vertices associated with the first mesh boundary with vertices associated with the second mesh boundary. For example, the mesh zippering engine 155 may, for each vertex associated with the first mesh boundary, identify a nearest vertex associated with the second mesh boundary and iteratively zipper the vertices together. The mesh refinement engine 150 may then weld (e.g., by combining one or more vertices within a specified distance from each other into a single vertex) vertices associated with the first mesh boundary to vertices associated with the second mesh boundary to form a continuous mesh surface. Further, during and/or between zippering iterations, the mesh refinement engine 150 may perform refinement passes to repair mesh distortions produced by the zippering process. The details of various mesh refinement operations are described below with respect to FIGS. 2-5.

Figure 2:
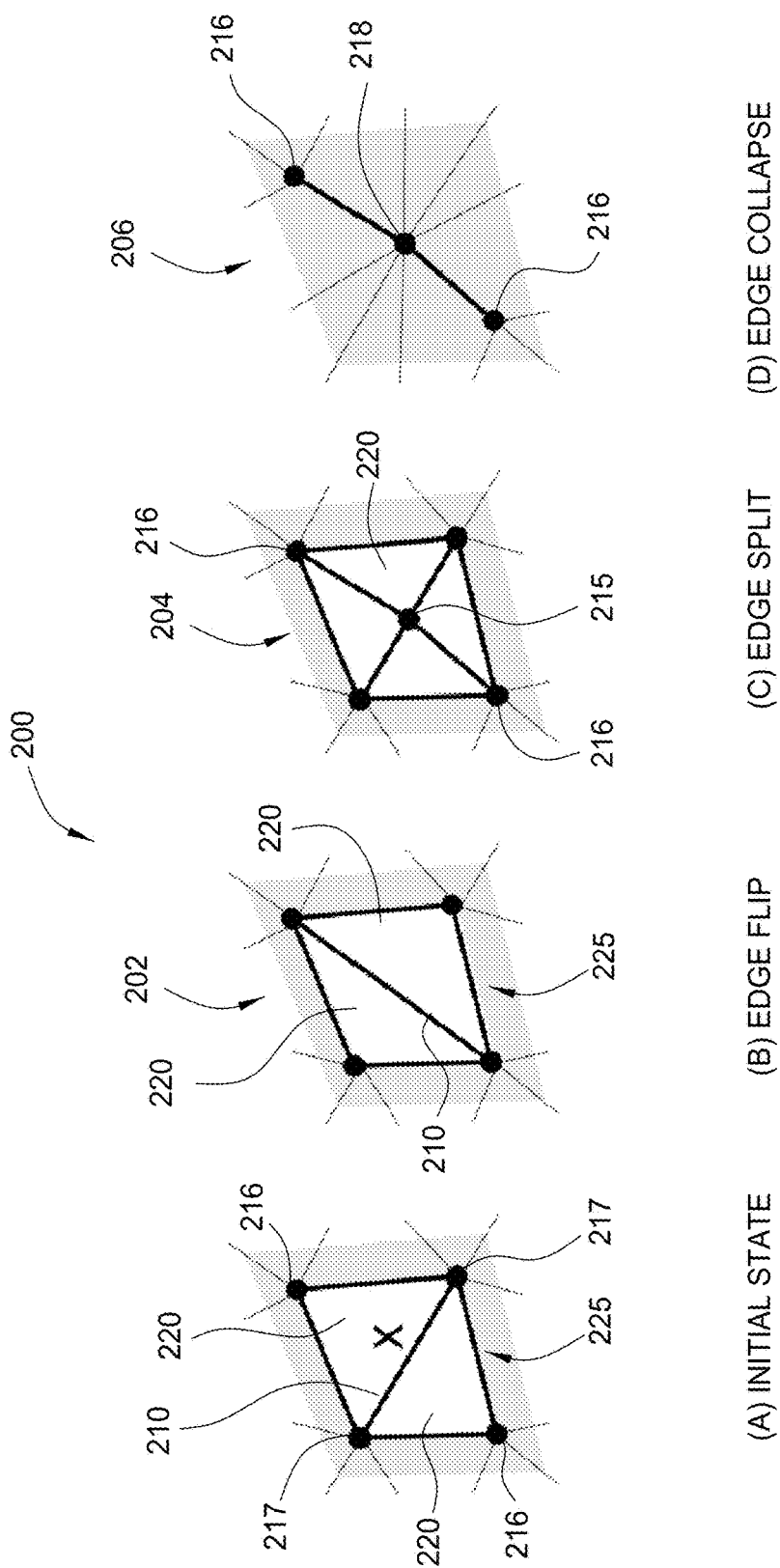
FIG. 2 illustrates edge operations for refining a mesh, according to one embodiment of the present invention.

FIG. 2 illustrates edge operations 200 for refining a mesh, according to one embodiment of the present invention. Edge operations 200 may be performed on a mesh to add an edge, remove an edge, and/or shift the position of an edge. Edge operations 200 may be applied to a mesh on a per-edge basis, or multiple edges may be processed in parallel.

As shown, the edge operations 200 include an edge flip operation 202, an edge split operation 204, and an edge collapse operation 206. An edge flip operation 202 is performed to rotate an edge 210 within the quadrilateral 225 formed by the two triangles 220 connected to the edge 210. An edge split operation 204 is performed to replace the two triangles 220 connected to the edge 210 with four triangles 220 by inserting a vertex 215 into the edge 210 and connecting the vertex 215 to the two vertices 216 opposite the edge 210. An edge collapse operation 206 removes the triangles 220 connected to the edge 210 and shifts the vertices 217 connected to the edge 210 to a new vertex position 218 (e.g., a midpoint of the initial edge 210). Conditions under which these edge operations 200 may be performed are described in further detail below with respect to FIG. 5.

Figure 3:
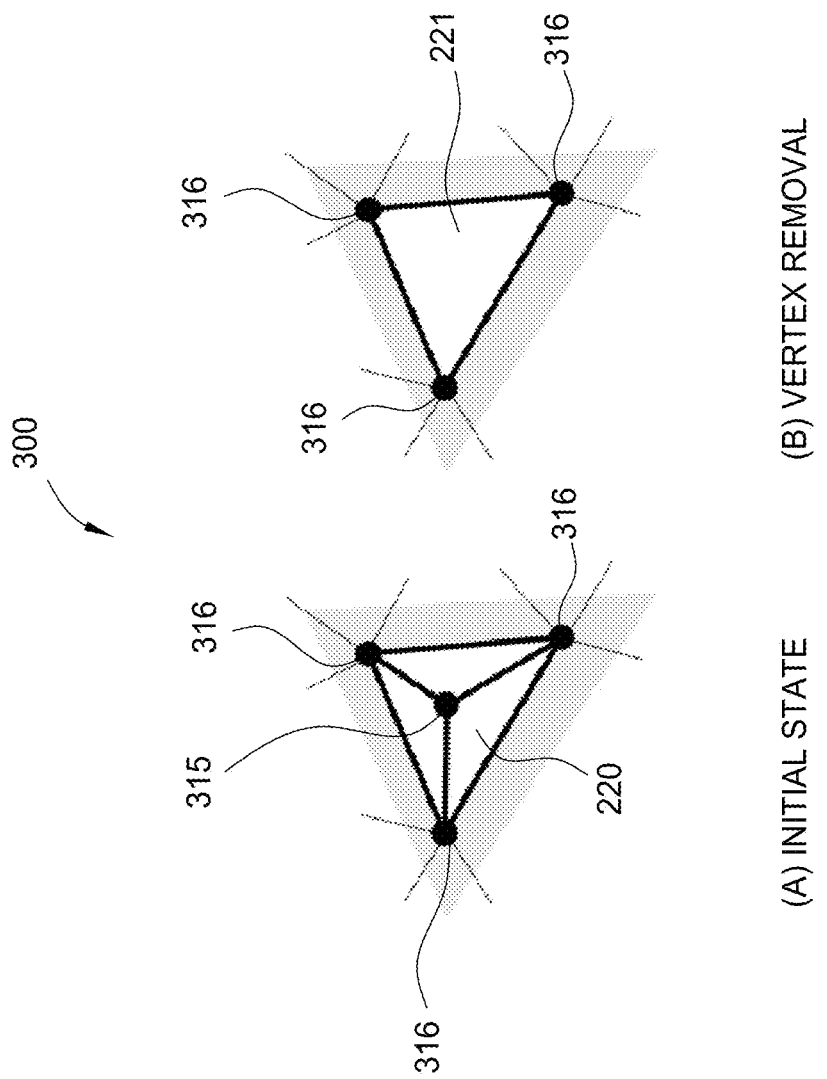
FIG. 3 illustrates a vertex removal operation for refining a mesh, according to one embodiment of the present invention.

FIG. 3 illustrates a vertex removal operation 300 for refining a mesh, according to one embodiment of the present invention. The vertex removal operation 300 may be applied to a mesh on a per-vertex basis, or multiple vertices may be processed in parallel. The vertex removal operation 300 may be performed to remove a vertex 315 connected to only three neighboring vertices 316 (i.e., a vertex 315 having a valence of three), also known as a tip vertex. Tip vertices 315 are necessarily surrounded by triangles 220 having large opening angles and, thus, may cause computational issues during subsequent processing of a mesh. Additionally, tip vertices 315 may collapse into the plane of their surrounding vertices 316 (e.g., when applying smoothing algorithms) and, as a result, may add little or no detail to the mesh. Consequently, to avoid such issues, tip vertices 315 may be removed via a vertex removal operation 300. After removal of a tip vertex 315, a new triangle 221 may be added to the mesh. Conditions under which a vertex removal operation 300 may be performed are described in further detail below with respect to FIG. 5.

Figure 4:
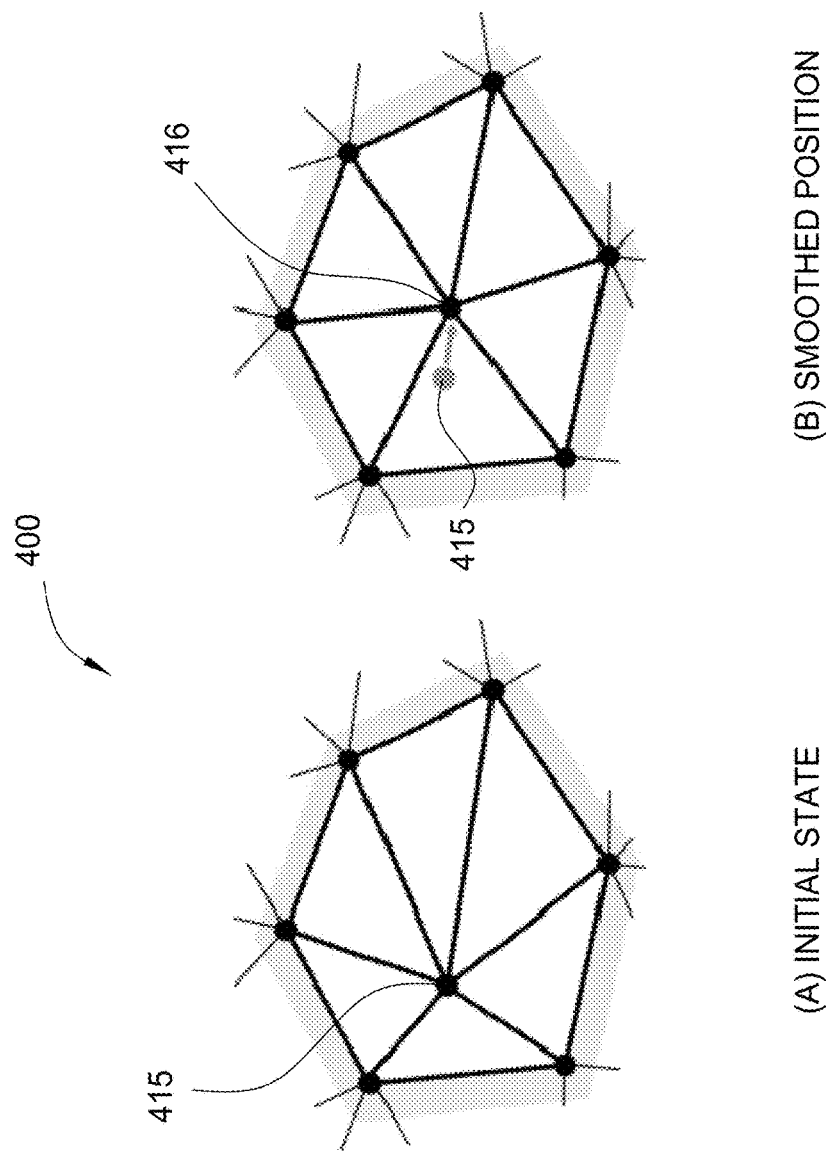
FIG. 4 illustrates a smoothing operation for refining a mesh, according to one embodiment of the present invention.

FIG. 4 illustrates a smoothing operation 400 for refining a mesh, according to one embodiment of the present invention. The smoothing operation 400 may be performed to more evenly distribute vertices in the mesh. In addition to improving the overall visual appearance of the mesh, the smoothing operation may be performed to reduce the number of small, irregularly-sized triangles that occur along mesh boundaries. Such triangles may be generated when edge operations are performed along preserved boundaries.

As shown; the smoothing operation 400 may shift a vertex 415 from an initial position to a smoothed vertex position 416. The location of the smoothed vertex position 416 may be based on a smoothing algorithm (e.g., a Laplacian smoothing algorithm) and a smoothing strength factor. Additional details regarding the smoothing operation 400 are described below with respect to FIG. 5.

Figure 5:
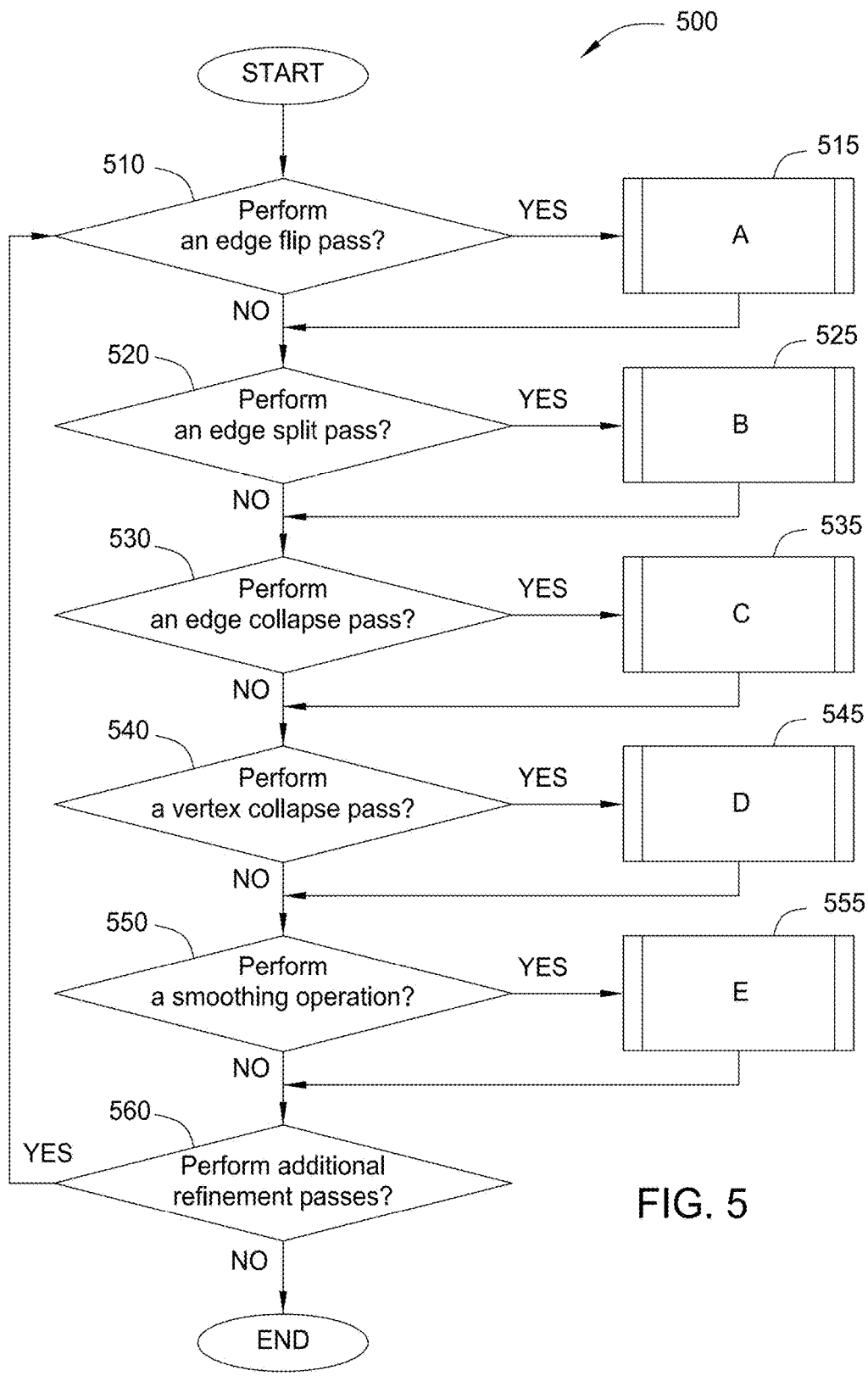
FIG. 5 is a flow diagram of method steps for refining a mesh of primitives, according to one embodiment of the present invention.

FIG. 5 is a flow diagram of method steps for refining a mesh of primitives, according to one embodiment of the present invention. Although the method steps are described in conjunction with the system of FIG. 1, persons skilled in the art will understand that any system configured to perform the method steps, in any order, falls within the scope of the present invention. Further, although mesh refinement operations are described as being performed in a particular order, the mesh refinement operations may be reordered and/or various mesh refinement operations may be repeated or omitted.

As shown, a method 500 begins at step 510, where the mesh refinement engine 150 determines whether to perform an edge flip pass on one or more edges 210 included in a mesh. During the edge flip pass, the mesh refinement engine 150 processes the edge(s) 210 to determine whether an edge flip operation 202 should be performed on the edge(s) 210. If the mesh refinement engine 150 determines that an edge flip pass should be performed, then subprocess A is executed at step 515.

Subprocess A—Edge Flip Operation

Upon executing subprocess A at step 515, the mesh refinement engine 150 identifies a triangle edge 210 included in a mesh. The mesh refinement engine 150 then optionally determines whether the edge 210 is on a preserved boundary of the mesh. A preserved boundary may include a limit (e.g., an outermost perimeter) of the mesh itself and/or a boundary selected by a user or generated by the mesh refinement engine 150. For example, the user may select a region of interest (ROI) in which mesh refinement operations are to be performed. Upon selecting the ROI, the user may further determine whether mesh refinement operations performed within the ROI are permitted to affect regions of the mesh that are outside of the ROI (e.g., in proximity to the ROI). If the mesh refinement operations are permitted to affect regions of the mesh outside of the ROI, then triangles adjacent or proximate to the ROI may be modified when performing mesh refinement operations. If the mesh refinement operations are not permitted to affect regions of the mesh outside of the ROI (i.e., the ROI boundary is a preserved boundary), then the position, shape, etc. of the ROI boundary may be retained, and triangles outside of the ROI are not modified when performing mesh refinement operations. Additionally, the user may pin one or more locations along the ROI boundary to prevent the mesh refinement engine 150 from modifying the position and shape of vertices and triangles at the pinned locations while allowing the mesh refinement engine 150 to modify other (e.g., unpinned) locations along the ROI boundary.

If the edge 210 is located on a preserved boundary (e.g., an ROI boundary, perimeter of the mesh, etc.), then the mesh refinement engine 150 determines not to flip the edge 210. As such, the preserved boundary is not modified. If the edge 210 is not located on a preserved boundary, then the mesh refinement engine 150 determines a potential flipped edge 210. Next, the mesh refinement engine 150 computes the length of the flipped edge 210 and compares this length to the product of a flip threshold $K_{flip}$ and the length of the initial edge 210. The flip threshold $K_{flip}$ is intended to reduce the occurrence of edge flips that do not significantly improve mesh quality. For example, by setting the flip threshold $K_{flip}$ to a value of 0.9, an edge 210 is flipped only if the flipped edge 210 is appreciably shorter than the initial edge 210. Other values for the flip threshold $K_{flip}$ (e.g., 0.95, 0.8, 0.75, etc.) may be selected as well.

If the length of the flipped edge 210 is greater than the product of the flip threshold $K_{flip}$ and the length of the initial edge 210, then the mesh refinement engine 150 determines not to flip the edge 210. If the length of the flipped edge 210 is not greater than the product of the flip threshold $K_{flip}$ and the length of the initial edge 210, then the mesh refinement engine 150 next determines a distance between the midpoint of the initial edge 210 and the midpoint of the flipped edge 210. The distance is then compared to the product of the midpoint threshold $K_{midpoint}$ and the length of the initial edge 210. The midpoint threshold $K_{midpoint}$ is intended to reduce the occurrence of edge flips that significantly change the shape of the mesh. For example, by setting the midpoint threshold $K_{midpoint}$ to a value of 0.2, an edge 210 is flipped only if the flipped edge 210 is in a plane that is near the plane in which the initial edge 210 resides. Other values for the midpoint threshold $K_{midpoint}$ (e.g., 0.1, 0.3, etc.) may be selected as well.

If the distance is greater than the product of the midpoint threshold $K_{midpoint}$ and the length of the initial edge 210, then the mesh refinement engine 150 determines not to flip the edge 210. If the distance is not greater than the product of the midpoint threshold $K_{midpoint}$ and the length of the initial edge 210, then the mesh refinement engine 150 next determines whether flipping the edge 210 would create a non-manifold edge. A non-manifold edge may be defined as an edge that is shared by more than two faces (e.g., an edge shared by more than two triangles). If flipping the edge 210 would create a non-manifold edge, then the mesh refinement engine 150 determines not to flip the edge 210. If flipping the edge 210 would not create a non-manifold edge, then the mesh refinement engine 150 flips the edge 210. Finally, the mesh refinement engine 150 determines whether to process another edge 210 included in the mesh. If another edge 210 is to be processed by the mesh refinement engine 150, then the mesh refinement engine 150 identifies another edge 210 included in the mesh and repeats the process described above. If no additional edges 210 are to be processed, then subprocess A ends, and the method proceeds to step 520.

At step 520, the mesh refinement engine 150 determines whether to perform an edge split pass on one or more edges 210 included in a mesh (e.g., to determine whether an edge split operation 204 should be performed on the edge(s) 210). If the mesh refinement engine 150 determines that an edge split pass should be performed, then subprocess B is executed at step 525.

Subprocess B—Edge Split Operation

Upon executing subprocess B at step 525, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to split the edge 210. If the edge 210 is not located on a preserved boundary, then the mesh refinement engine 150 compares a weighted length of the edge 210 to a split threshold $K_{split}$. The split threshold $K_{split}$ may be defined as the target maximum edge length. That is, by performing this comparison, at the end of an edge split pass, all processed edges 210 may be shorter than the split threshold $K_{split}$ length.

The weighting applied to the length of the edge 210 may be based on the per-vertex refinement weights assigned to the two vertices 217 to which the edge 210 is connected. The per-vertex refinement weights may be assigned to vertices by the mesh refinement engine 150, or the per-vertex refinement weights may be based on user selection (e.g., based on a weight refinement mask). In general, refinement weights assigned to vertices, edges, etc. may control the conditions under which a refinement operation is performed. For example, assigning a higher weighting to a vertex may increase the likelihood that a refinement operation will be performed on the vertex (e.g., a vertex collapse operation 300) or on an edge associated with the vertex (e.g., an edge split operation 204). Conversely, assigning a lower weighting to a vertex may decrease the likelihood that a refinement operation will be performed on the vertex or on an edge associated with the vertex. Further, assigning a zero weighting to a vertex may indicate that a refinement operation will not be performed on the vertex or on an edge associated with the vertex.

If the weighted length of the edge 210 is not greater than the split threshold $K_{split}$, then the mesh refinement engine 150 determines not to split the edge 210. If the weighted length of the edge 210 is greater than the split threshold $K_{split}$, then the mesh refinement engine 150 adds the edge 210 to a split edge list. Next, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then the edge(s) 210 included in the split edge list are optionally sorted by length. Finally, the edge(s) 210 included in the split edge list are split. If the edges 210 were sorted, then the edges 210 included in the split edge list may be split in order of longest edge length to shortest edge length. Once all edges on the split edge list have been split, subprocess B ends, and the method proceeds to step 530.

At step 530, the mesh refinement engine 150 determines whether to perform an edge collapse pass on one or more edges 210 included in a mesh (e.g., to determine whether an edge collapse operation 206 should be performed on the edge(s) 210). If the mesh refinement engine 150 determines that an edge collapse pass should be performed, then subprocess C is executed at step 535.

Subprocess C—Edge Collapse Operation

Upon executing subprocess C at step 535, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to collapse the edge 210. If the edge 210 is not located on a preserved boundary, then the mesh refinement engine 150 next determines whether at least one of two inequalities are satisfied. With reference to the first inequality, the mesh refinement engine 150 determines whether a weighted length (e.g., based on per-vertex refinement weights described above) of the edge 210 is greater than a collapse threshold $K_{collapse}$. The collapse threshold $K_{collapse}$ is intended to collapse edges 210 that are shorter than the value assigned to this threshold. With reference to the second inequality, the mesh refinement engine 150 determines whether a minimum opposing angle of one of the two triangles connected to the edge 210 is less than a target angle $T_{collapse}$. The target angle $T_{collapse}$ is intended to collapse triangles 220 having an angle that is less than the value assigned to this target. Thus, after an edge collapse pass, all angles included in the processed triangles 220 may be greater than the target angle $T_{collapse}$. Furthermore, because this criterion is scale-independent (e.g., the target angle $T_{collapse}$ does not depend on the relative size of triangles in the mesh), mesh quality may be significantly improved even if $K_{collapse}$ is assigned an inappropriate value.

If one or both of the first inequality and second inequality are satisfied, the mesh refinement engine 150 then determines whether collapsing the edge 210 would create a non-manifold edge. If collapsing the edge 210 would create a non-manifold edge, then the mesh refinement engine 150 determines not to collapse the edge 210. If collapsing the edge 210 would not create a non-manifold edge, then the mesh refinement engine 150 collapses the edge 210. Finally, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then subprocess C ends, and the method proceeds to step 540.

At step 540, the mesh refinement engine 150 determines whether to perform a vertex collapse pass on one or more vertices 315 included in a mesh (e.g., to determine whether a vertex collapse operation 300 should be performed on the vertices 315). If the mesh refinement engine 150 determines that a vertex collapse pass should be performed, then subprocess D is executed at step 545.

Subprocess D—Vertex Collapse Operation

Upon executing subprocess D at step 545, the mesh refinement engine 150 identifies a triangle vertex 315 included in a mesh. The mesh refinement engine 150 then optionally determines whether the vertex 315 is on a preserved boundary of the mesh. If the vertex 315 is located on a preserved boundary (e.g., an ROI boundary, perimeter of the mesh, etc.), then the mesh refinement engine 150 determines not to collapse the vertex 315. If the vertex 315 is not located on a preserved boundary, then the mesh refinement engine 150 determines whether the vertex 315 has a valence equal to three (i.e., the vertex 315 is connected to only three neighboring vertices 316). If the vertex 315 does not have a valence equal to three, then the vertex 315 is not collapsed.

If the vertex 315 has a valence equal to three, then the mesh refinement engine 150 optionally determines whether all triangles connected to the vertex 315 are located within the ROI. If all triangles connected to the vertex 315 are not located within the ROI, then the vertex 315 is not collapsed. If all triangles connected to the vertex 315 are located within the ROI, then the mesh refinement engine 150 next determines whether a neighboring vertex 316 has a valence higher than three. If no neighboring vertex 316 has a valence higher than three, then the vertex 315 is not collapsed. If a neighboring vertex 316 has a valence higher than three, then the vertex 315 is collapsed and a new triangle 221 is added to the mesh. Finally, the mesh refinement engine 150 determines whether to process another vertex 315 included in the mesh. If another vertex 315 is to be processed by the mesh refinement engine 150, then another vertex 315 included in the mesh is identified, and the process described above is repeated. If no additional vertices 315 are to be processed, then subprocess D ends, and the method proceeds to step 550.

At step 550, the mesh refinement engine 150 determines whether to perform a smoothing operation 400 on one or more vertices 415 included in a mesh. If the mesh refinement engine 150 determines that a smoothing operation 400 should be performed, then subprocess E is executed at step 555.

Subprocess E—Smoothing Operation

Upon executing subprocess E at step 555, the mesh refinement engine 150 identifies a triangle vertex 415 included in a mesh. The mesh refinement engine 150 then determines a smoothed vertex position 416. The smoothed vertex position 416 may be determined using a smoothing algorithm, such as a uniform Laplacian smoothing algorithm. Next, a smoothing weight may be determined based on a strength factor and/or a weight function value. The strength factor may be a user-defined value (e.g., a brush tool parameter in application 140). The weight function value may be based on a weight mask generated by the mesh refinement engine 150 or defined by the user.

Next, a weighted vertex position is determined based on the smoothed vertex position 416 and (optionally) based on the smoothing weight. For example, the weighted vertex position may be computed by interpolating the initial vertex position 415 and the smoothed vertex position 416 or by performing linear blending using the initial vertex position 415 (V), the smoothed vertex position 416 (V'), and the smoothing weight (WS). An exemplary formula for performing linear blending to determine a weighted vertex position (V") is provided in Equation 1, below.

$$V''=(1-WS)\times V+(WS)\times V' \quad \text{(Eq. 1)}$$

Finally, at step 560, the mesh refinement engine 150 determines whether to perform additional mesh refinement passes. If the mesh refinement engine 150 determines that additional refinement passes should be performed, then the method returns to step 510, as previously described herein. Alternatively, upon determining that additional refinement passes should be performed, the method may return to any of step 510, step 520, step 530, step 540, and/or step 550, as also previously described herein. Furthermore, the flow diagram may be traversed such that one or more of the edge operations 200 are performed before and/or after the vertex collapse operation 300 and/or the smoothing operation 400. If the mesh refinement engine 150 determines that additional refinement passes should not be performed, then the method ends.

In addition to repairing mesh distortions and irregularities, the mesh refinement engine 150 enables a user to perform other types of mesh operations. For example, the mesh refinement engine 150 enables a user to refine primitives associated with to an intersection boundary defined between two or more meshes of primitives, enabling the mesh intersection engine 157 and the mesh zippering engine 155 to more effectively merge the meshes along the intersection boundary. Such techniques are described below in further detail.

Adaptively Merging Intersecting Meshes

Figure 6:
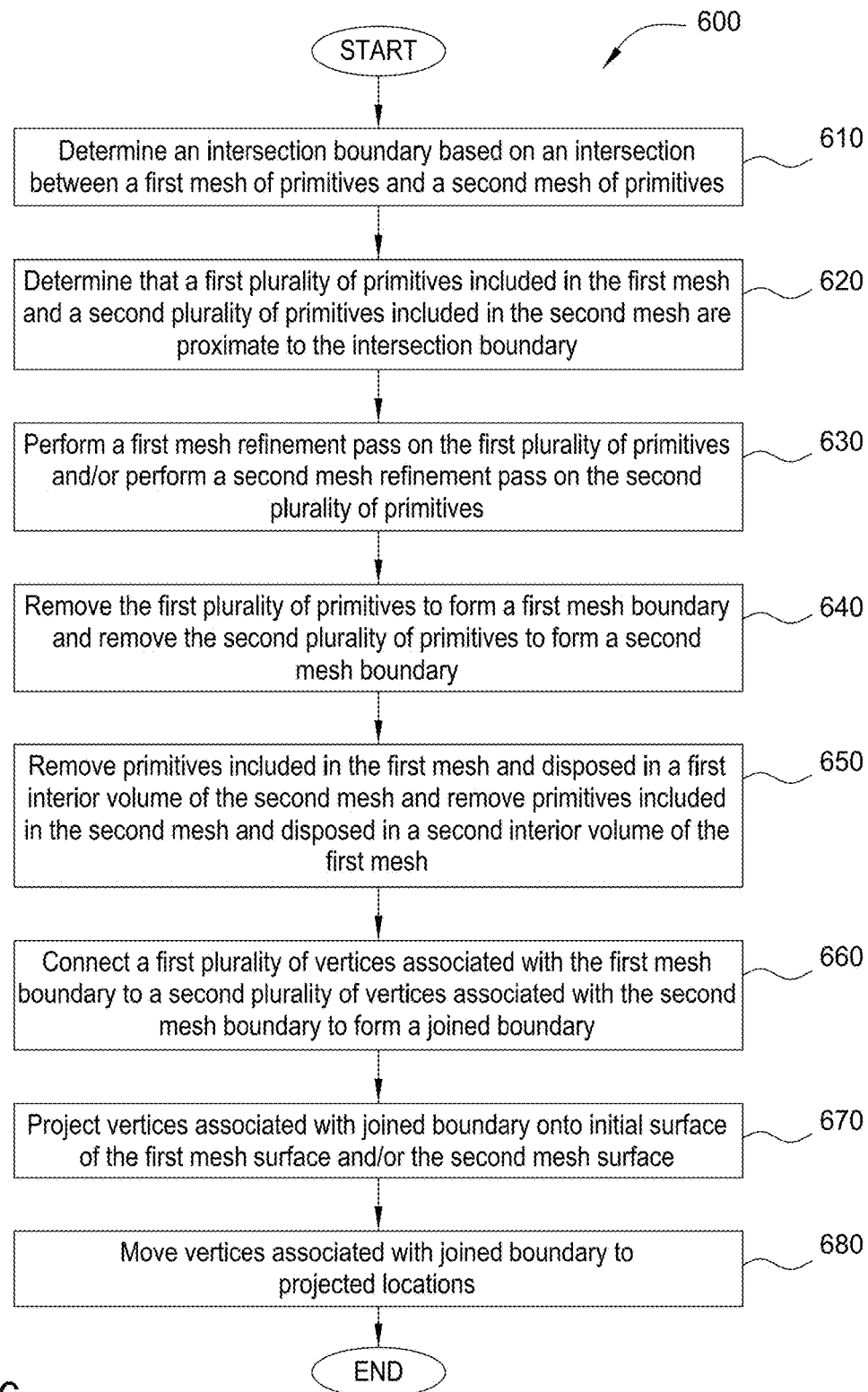
FIG. 6 is a flow diagram of method steps for merging intersecting meshes of primitives, according to one embodiment of the present invention.

FIG. 6 is a flow diagram of method steps for merging intersecting meshes of primitives, according to one embodiment of the present invention. Although the method steps are described in conjunction with the system of FIG. 1, persons skilled in the art will understand that any system configured to perform the method steps, in any order, falls within the scope of the present invention.

Figure 7A:
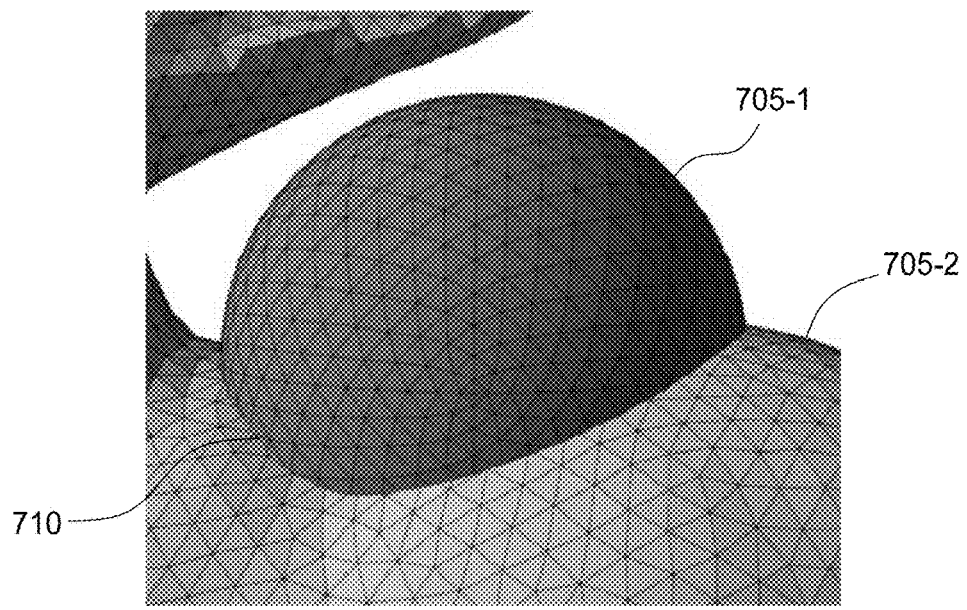
FIG. 7A illustrates a first mesh of primitives intersecting a second mesh of primitives, according to one embodiment of the present invention.

As shown, a method 600 begins at step 610, where an intersection boundary between a first mesh of primitives and a second mesh of primitives is determined by the mesh intersection engine 157. The intersection boundary may be defined by one or more points, lines, curves, loops, etc. at which or along which the first mesh and the second mesh intersect one another. For example, a closed surface associated with the first mesh may intersect a closed surface associated with the second mesh such that the resulting intersection boundary forms a closed loop. An exemplary closed loop intersection boundary 710 is shown in FIG. 7A, which illustrates a first mesh of primitives 705-1 intersecting a second mesh of primitives 705-2, according to one embodiment of the present invention. More specifically, the first mesh 705-1 shown in FIG. 7A is a spherical mesh that intersects a contoured mesh surface associated with the second mesh 705-2. Consequently, the intersection boundary 710 associated with the meshes 705-1, 705-2 forms a circular boundary loop.

At step 620, the mesh intersection engine 157 determines that a first plurality of primitives included in the first mesh (e.g., 705-1) and a second plurality of primitives included in the second mesh (e.g., 705-2) are proximate to the intersection boundary 710. Next, at step 630, the mesh refinement engine 150 may perform one or more refinement passes (e.g., edge operations, vertex operations, and/or smoothing operations) on the primitives determined in step 620. Mesh refinement passes may be performed on primitives near the intersection boundary 710 in order to equalize the vertex densities of the first mesh and the second mesh near the intersection boundary 710. By equalizing (or approximately equalizing) vertex densities along the intersection boundary 710, vertices associated with the first mesh may be more efficiently aligned with and connected to vertices associated with the second mesh at step 660.

Figure 7B:
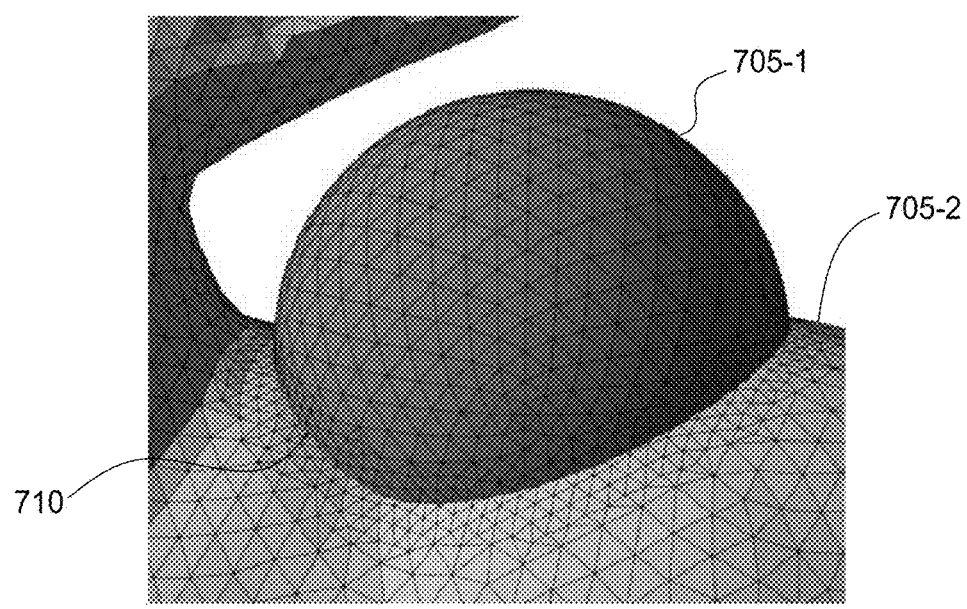
FIG. 7B illustrates the first mesh of primitives and the second mesh of primitives after performing multiple mesh refinement passes on primitives proximate to an intersection boundary; according to one embodiment of the present invention.

In one implementation, the mesh refinement engine 150 may perform an edge collapse operation 206 and/or vertex removal operation 300 on primitives proximate to the intersection boundary 710 in order to decrease the vertex density of the first mesh and/or the second mesh near the intersection boundary 710. In another implementation, the mesh refinement engine 150 may perform an edge split operation 204 on primitives proximate to the intersection boundary 710 in order to increase the vertex density of the first mesh and/or the second mesh near the intersection boundary 710. An example in which mesh refinement passes have been performed in order to increase vertex densities near the intersection boundary 710 is shown in FIG. 7B, which illustrates the first mesh of primitives 705-1 and the second mesh of primitives 705-2 after performing multiple mesh refinement passes on primitives proximate to an intersection boundary 710, according to one embodiment of the present invention. Additionally, instead of (or in addition to) equalizing vertex densities at step 630, one or more mesh refinement passes may be performed at step 660 (e.g., to equalize vertex densities while performing a mesh zippering operation), as described in further detail with respect to FIGS. 10A-10C.

Figure 7C:
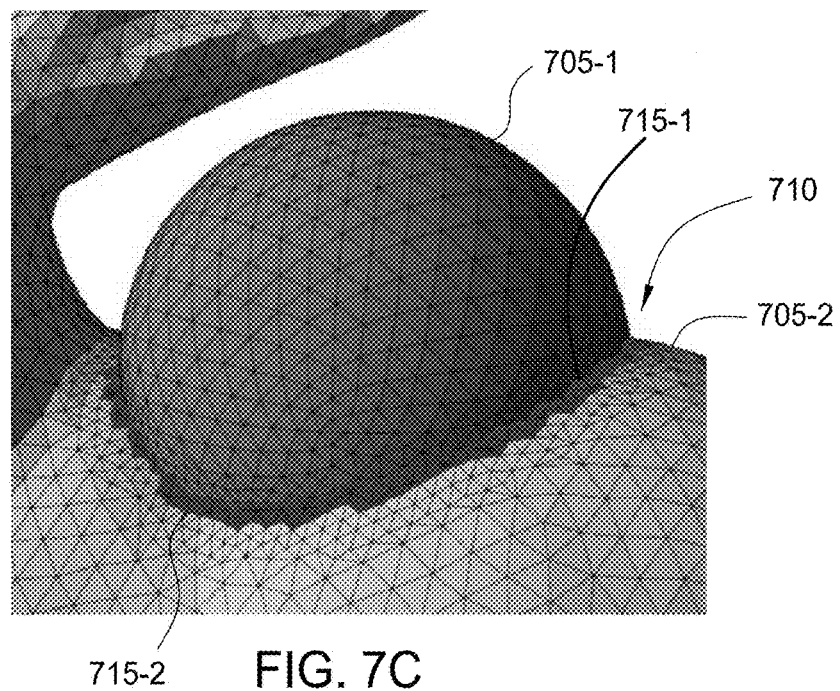
FIGS. 7C and 7D illustrate a first mesh boundary and a second mesh boundary formed after removal of a first plurality of primitives and a second plurality of primitives proximate to an intersection boundary, according to one embodiment of the present invention.
Figure 7D:
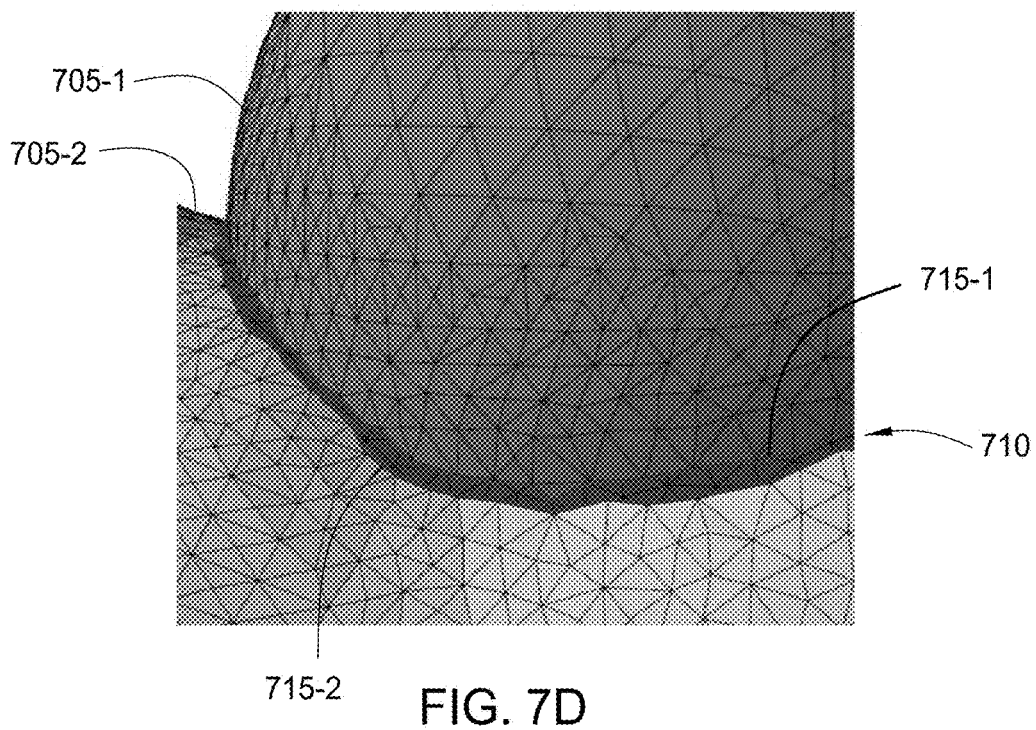

At step 640, the first plurality of primitives (i.e., included in the first mesh and proximate to the intersection boundary 710) may be removed from the first mesh to form a first mesh boundary. Additionally, the second plurality of primitives (i.e., included in the second mesh proximate to the intersection boundary 710) may be removed from the second mesh to form a second mesh boundary. The results of such a removal operation are shown in FIGS. 7C and 7D, which illustrate a first mesh boundary 715-1 and a second mesh boundary 715-2 formed after removal of a first plurality of primitives and a second plurality of primitives proximate to an intersection boundary 710, according to one embodiment of the present invention. As shown, removal of the primitives near the intersection boundary 710 produces a gap between the first mesh 705-1 and the second mesh 705-2. However, by increasing the vertex densities of the first mesh 705-1 and the second mesh 705-2 near the intersection boundary 710 (e.g., at step 630), a smaller gap may be generated upon removing the first plurality of primitives and second plurality of primitives at step 640, enabling the vertices associated with the first mesh boundary and second mesh boundary to be more efficiently connected at step 660.

In addition to removing primitives proximate to the intersection boundary 710, the mesh intersection engine 157 may remove primitives associated with the first mesh that are disposed within an interior volume of the second mesh and/or primitives associated with the second mesh that are disposed within an interior volume of the first mesh. Because such primitives generally are not visible after intersecting the meshes and may increase the computational workload associated with the meshes, these primitives may be removed. For example, with reference to FIG. 7A, primitives associated with the lower portion of the first mesh 705-1 (i.e., primitives disposed below the contoured surface of the second mesh 705-2) may be removed. Similarly, with further reference to FIG. 7A, primitives associated with the contoured surface of the second mesh 705-2 (i.e., primitives disposed within the spherical surface of the first mesh 705-1) may be removed.

Figure 7E:
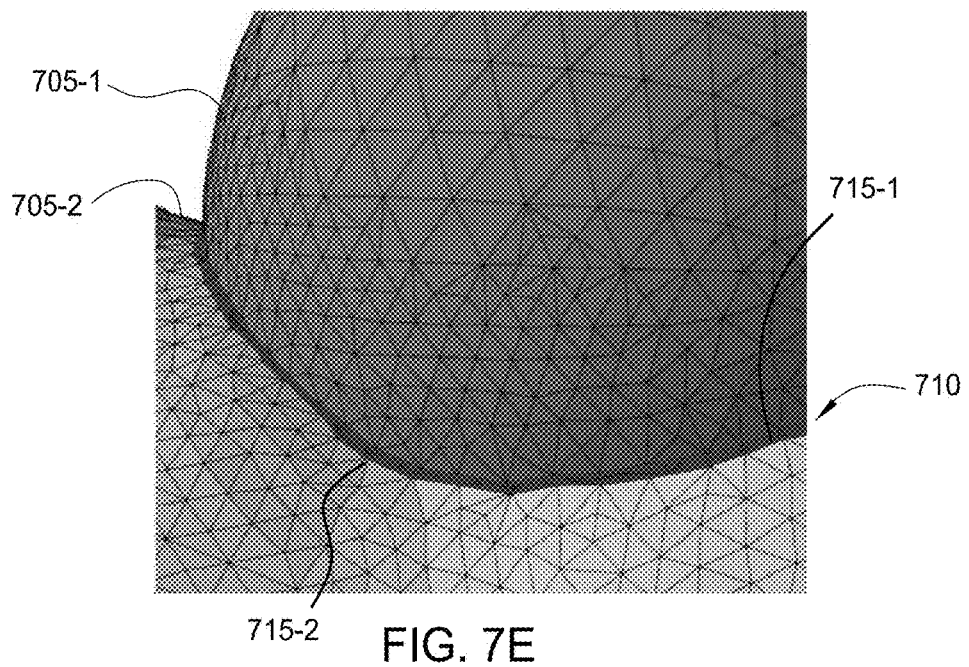
FIGS. 7E-7G illustrate mesh zippering iterations performed on the first mesh boundary and the second mesh boundary, according to one embodiment of the present invention.
Figure 7F:
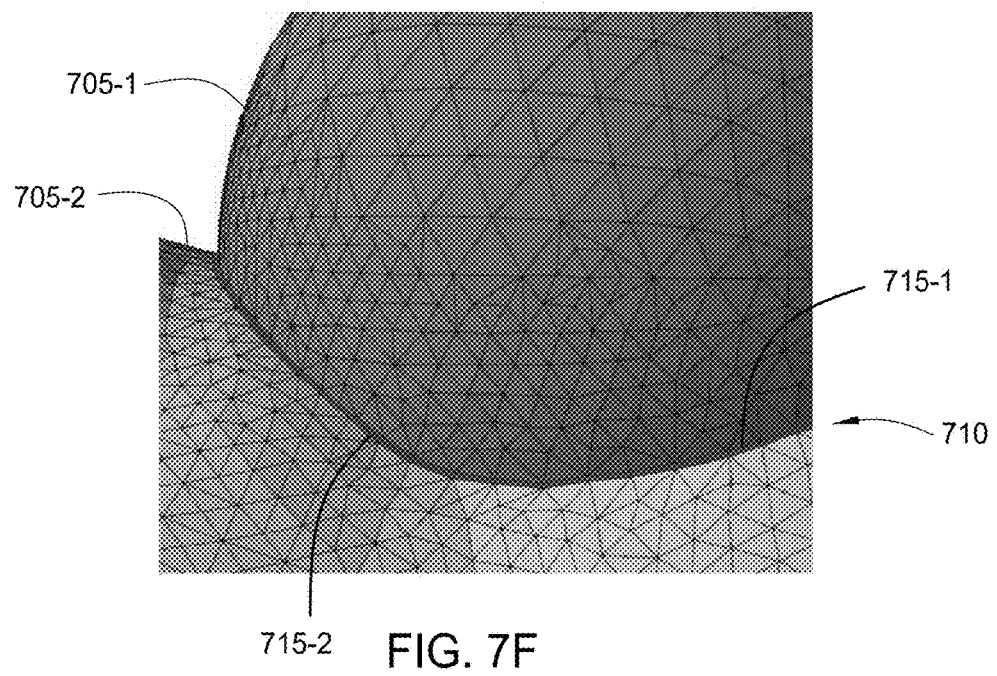
Figure 7G:
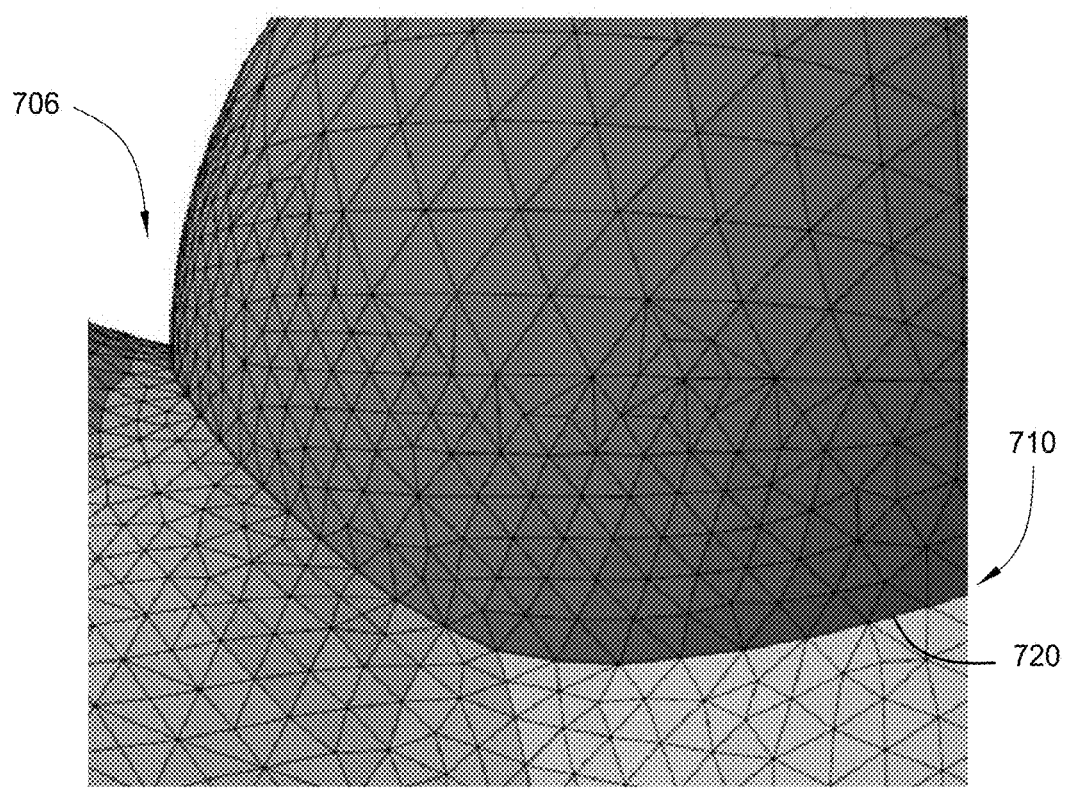

Next, at step 660, vertices associated with the first mesh boundary are connected to vertices associated with the second mesh boundary. A number of different techniques may be used to connect vertices associated with the mesh boundaries. In one technique, one or more primitive edges may be inserted to connect a vertex associated with the first mesh boundary to one or more vertices associated with the second mesh boundary. One or more mesh refinement passes may then be performed on the resulting joined boundary in order to repair any mesh distortions generated during the joining process. In another technique, the mesh zippering engine 155 may be used to move each vertex associated with the first mesh boundary towards a proximate (e.g., nearest) vertex associated with the second mesh boundary. An exemplary method for zippering an intersection boundary 710 between a first mesh and a second mesh is described below in further detail with respect to the flow diagram of FIG. 8. The vertices associated with the first mesh boundary and the second mesh boundary may be connected in an incremental manner, as shown in FIGS. 7E-7G, which illustrate mesh zippering iterations performed on the first mesh boundary and the second mesh boundary, according to one embodiment of the present invention.

At step 670, after connecting the first mesh boundary to the second mesh boundary, vertices associated with the resulting joined boundary 720 may be projected on an initial surface of the first mesh and/or second mesh. Projecting vertices onto the initial surface(s) preserves the approximate shape of the meshes during and/or after the intersection, zippering, and mesh refinement operations. The initial surface of a mesh may include the locations (e.g., locations defined in three-dimensional space) of one or more planes, edges, points, etc. associated with the mesh prior to performing mesh refinement at step 630, vertex removal at step 640, and/or prior to connecting vertices at step 660. That is, the initial surface may represent the general shape of a mesh prior to modifying the mesh to form a joined mesh 706 in the manner described above.

After the optional projection of vertices onto the initial surface(s), the vertices associated with the joined boundary 720 may be moved to the projected locations at step 680. The resulting joined mesh boundary 720 is shown in FIG. 7G, which illustrates a joined mesh 706 formed by intersecting the first mesh 705-1 and the second mesh 705-2, according to one embodiment of the present invention.

The techniques described above with respect to FIGS. 6 and 7A-7G may be used to perform Boolean-like operations (e.g., Boolean difference, Boolean intersection, etc.) on meshes of primitives. In one implementation, the techniques described above may be used to compute a Boolean difference between a first mesh and a second mesh (e.g., subtraction of the second mesh from the first mesh). For example, at steps 610, 640, and/or 650, the mesh intersection engine 157 may determine and remove a first portion of the first mesh that is inside of the second mesh and determine and remove a second portion of the second mesh that is outside of the first mesh. The orientation of the remaining portions of the second mesh may then be reversed (e.g., by reversing the direction of surface normals associated with primitives in the second mesh). In another implementation, the techniques described above may be used to compute a Boolean intersection between a first mesh and a second mesh. For example, the mesh intersection engine 157 may determine and remove a first portion of the first mesh that is outside of the second mesh and determine and remove a second portion of the second mesh that is outside of the first mesh. Additionally, other types of Boolean operators may be implemented to perform mesh intersections using the techniques described above.

Figure 8:
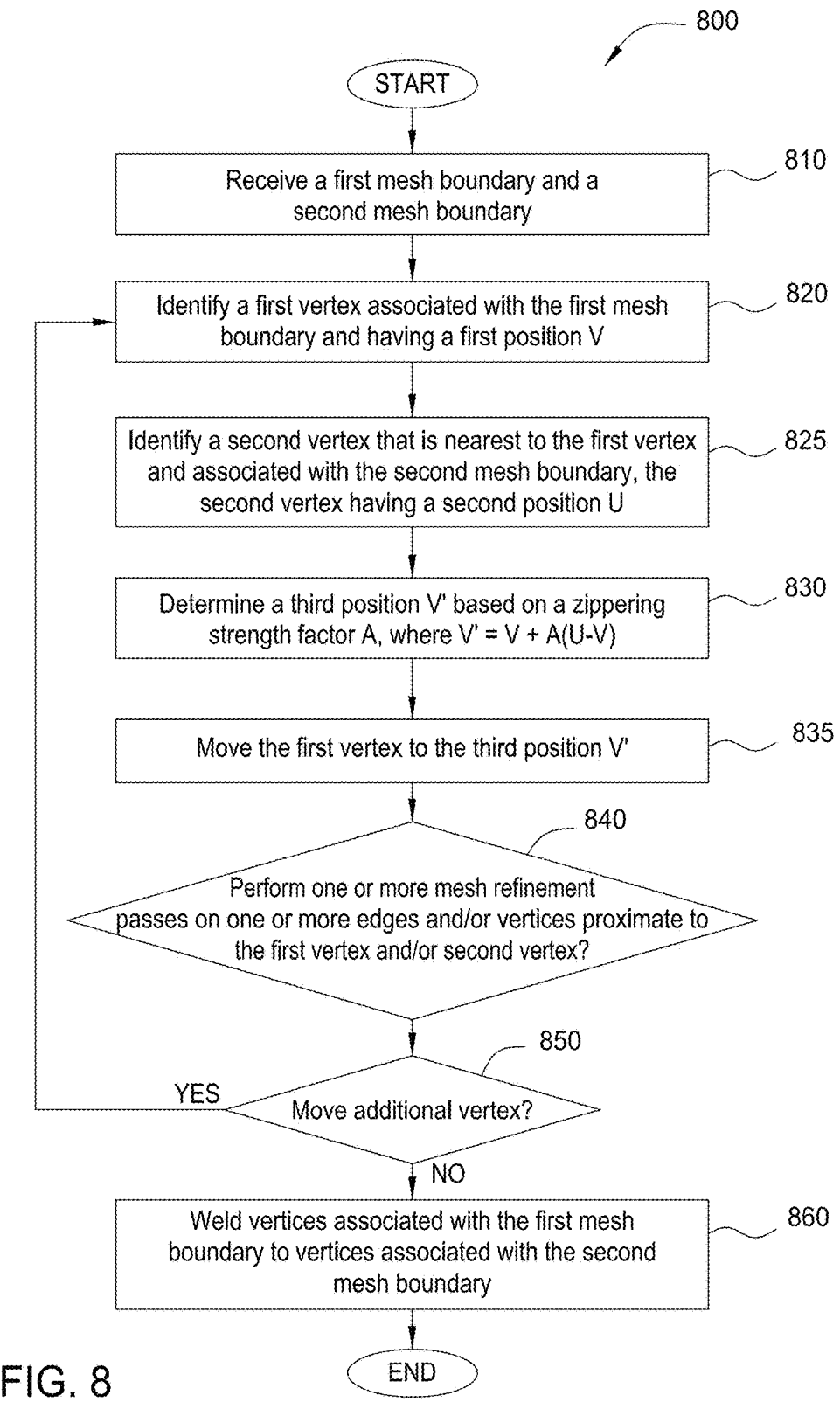
FIG. 8 is a flow diagram of method steps for zippering an intersection boundary between two different meshes of primitives, according to one embodiment of the present invention.

FIG. 8 is a flow diagram of method steps for zippering an intersection boundary between two different meshes of primitives, according to one embodiment of the present invention. Although the method steps are described in conjunction with the system of FIG. 1, persons skilled in the art will understand that any system configured to perform the method steps, in any order, falls within the scope of the present invention.

As shown, a method 800 begins at step 810, where a first mesh boundary and a second mesh boundary are received by the mesh zippering engine 155. Exemplary mesh boundaries (e.g., 715-1 and 715-2) are shown in FIGS. 9A-9F, which illustrate a series of zippering iterations performed on mesh boundaries 715 by the mesh zippering engine 155, according to one embodiment of the present invention. At step 820, a first vertex 910 (e.g., 910-1) associated with the first mesh boundary 715 and having a first position V is identified by the mesh zippering engine 155. At step 825, a second vertex 910 (e.g., 910-2) that is proximate (e.g., nearest) to the first vertex 910, is associated with the second mesh boundary 715, and has a second position U as identified by the mesh zippering engine 155. Vertices 910-1 and 910-2 may also be referred to as vertex pair 915-1.

Next, at step 830, the mesh zippering engine 155 determines a third position V'. In one implementation, the third position V' may be based on the first position V, the second position U, and a zippering strength factor A. The third position may be determined by multiplying the initial distance between the vertices 910 by the zippering strength factor. The zipper strength factor A may be in the range [0, 0.5]. In general, a lower zippering strength value A may result in a more regular zippered mesh. However, lower zippering strength values A may require a greater number of iterations for the mesh boundaries 715 to converge. An exemplary formula for calculating the third position V' is provided in Equation 2, below. At step 835, the mesh zippering engine 155 moves the first vertex to the third position.

$$V'=V+A(U-V) \quad (Eq. 2)$$

At step 840, one or more mesh refinement passes (e.g., edge operations, vertex operations, and/or smoothing operations) may be performed on edges and/or vertices proximate to the first vertex 910 and/or second vertex 910 using the mesh refinement engine 150. For example, as shown in FIGS. 7E and 7F, the mesh refinement engine 150 may perform an edge collapse operation 206 to remove one or more edges and/or vertices on or near the mesh boundaries 715. For example, during or between zippering iterations, the mesh refinement engine 150 may determine that a first edge 920-1 and a second edge 920-2 are shorter than a collapse threshold $K_{collapse}$ length. The first edge 920-1 and the second edge 920-2 may then be collapsed, improving the alignment between vertices 910 along the intersection boundary 710. Additionally, other types of mesh refinement operations (e.g., edge split operation 204 and smoothing operation 400) may be performed to repair mesh distortions and improve triangle regularity near the zippered mesh boundaries.

At step 850, the mesh zippering engine 155 determines whether to move an additional vertex 910. If the mesh zippering engine 155 determines that an additional vertex should be moved, then the zippering operation is repeated beginning at step 820, and an additional vertex pair 915 (e.g., 915-2, 915-3, 915-4, 915-5, etc.) may then be identified and iteratively zippered together. Finally, at step 860, once the vertices 910 associated with a vertex pair 915 are brought within a threshold distance of one another and/or are sufficiently aligned, the vertices 910 optionally may be "welded" to form a single vertex 910 of a continuous mesh surface, as shown in FIG. 9F.

Figures 10A, 10B, 10C:
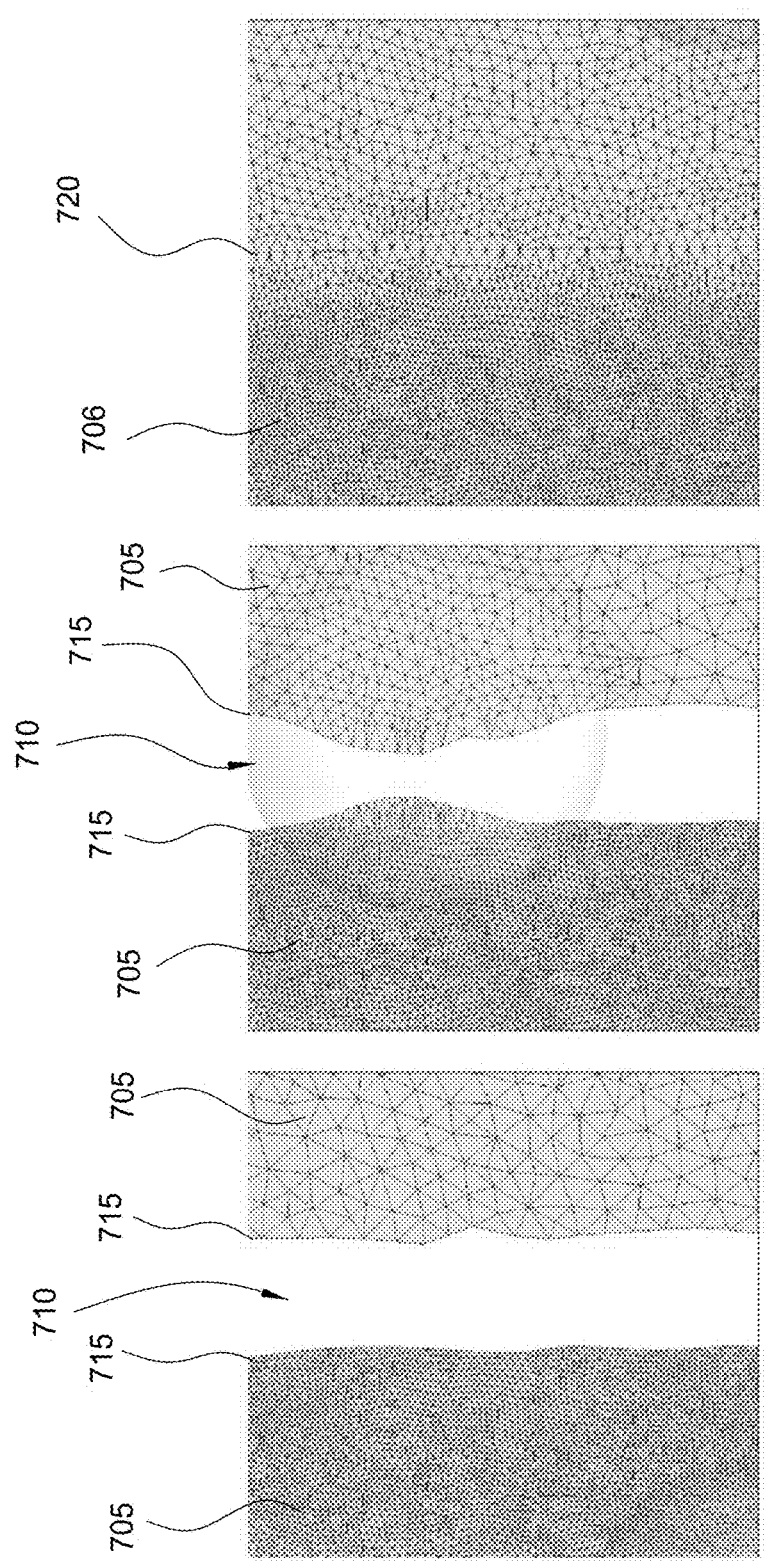
FIGS. 10A-10C illustrate a series of zippering iterations performed by the mesh zippering engine on mesh boundaries having different vertex densities, according to one embodiment of the present invention.

Although the techniques for merging intersecting meshes of primitives described above include performing mesh refinement passes (e.g., at step 630) prior to removing primitives proximate to the intersection boundary 710 (e.g., at step 640), in other implementations, mesh refinement passes may be performed during the connection operation (e.g., zippering operation) at step 660. Such an implementation is shown in FIGS. 10A-10C, which illustrate a series of zippering iterations performed by the mesh zippering engine 155 on mesh boundaries 715 having different vertex densities, according to one embodiment of the present invention.

As shown, a first mesh boundary 715 (left) has a higher vertex density than a second mesh boundary 715 (right). In general, when performing a zippering operation, multiple vertices associated with the higher density mesh boundary 715 are drawn towards a single vertex associated with the lower density mesh boundary 715. Consequently, after several zippering iterations, the multiple of vertices may become squeezed together, reducing the sizes and angles of edges associated with the multiple vertices. However, such edges may be removed (e.g., collapsed) by performing one or more mesh refinement passes during and/or between zippering iterations. Thus, as multiple vertices associated with the higher density mesh boundary 715 merge toward a single vertex associated with the lower density mesh boundary 715, the mesh refinement engine 150 may collapse the multiple vertices into a single vertex to better match the vertex densities at the mesh boundaries 715. In addition, various mesh refinement operations (e.g., edge split operations 204) may be performed on vertices located on or near the lower density mesh boundary 715 to increase the vertex density near the mesh boundary 715. Accordingly, as shown in FIG. 8C, after a series of zippering iterations and mesh refinements passes, vertices associated with the mesh boundaries 715 are aligned and zippered together to form a joined boundary 720. Further, the vertex densities of the respective meshes 705 have been blended together to form a joined mesh 706, reducing mesh distortions and creating a pleasing visual appearance.

In sum, a mesh intersection engine determines an intersection boundary between a first mesh and a second mesh. Primitives associated with the intersection boundary are then removed. Additionally, unwanted portions of the first mesh and the second mesh (e.g., portions inside of the intersection boundary) may be removed. A vertex associated with the first mesh that is proximate to a vertex associated with the second mesh is then identified, and the vertices are drawn together. As vertices associated with the first mesh are drawn closer to vertices associated with the second mesh, mesh distortions and irregularities generated during the zippering process may be repaired by performing one or more edge operator passes, tip-collapse passes, and/or smoothing passes using a mesh refinement engine.

One advantage of the techniques described herein is that a user is able to merge intersecting mesh surfaces in a manner that does not result in significant mesh distortions or irregularities. After removal of unwanted portions of the mesh surfaces, a zippering algorithm may be applied in an iterative manner to connect vertices associated with the first mesh surface to vertices associated with the second mesh surface, while at the same time refining mesh distortions and irregularities generated by the zippering process. The disclosed technique, among other things, enables intersecting meshes having similar or dissimilar triangle and vertex densities to be efficiently merged with relatively little preparation.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for merging intersecting meshes of primitives, the method comprising:
   determining an intersection boundary that is defined by an intersection between a first mesh of primitives and a second mesh of primitives;
   determining that a first plurality of primitives included in the first mesh of primitives are proximate to the intersection boundary;
   determining that a second plurality of primitives included in the second mesh of primitives are proximate to the intersection boundary;
   performing a first density refinement operation to reduce a first vertex density associated with the first plurality of primitives;
   performing a second density refinement operation to increase a second vertex density associated with the second plurality of primitives, wherein, after the first density refinement operation and the second density refinement operation are performed, the first vertex density and the second vertex density are substantially equal;
   removing the first plurality of primitives to form a first mesh boundary associated with the first mesh of primitives;
   removing the second plurality of primitives to form a second mesh boundary associated with the second mesh of primitives; and
   connecting a first plurality of vertices associated with the first mesh boundary to a second plurality of vertices associated with the second mesh boundary to form a joined boundary.

2. The method of claim 1, further comprising:
   performing a first mesh refinement pass on the first plurality of primitives to produce the first vertex density; and
   performing a second mesh refinement pass on the second plurality of primitives to produce the second vertex density.

3. The method of claim 1, wherein connecting the first plurality of vertices to the second plurality of vertices comprises:
   identifying a first vertex included in the first plurality of vertices and having a first position;
   identifying a second vertex that is proximate to the first vertex and included in the second plurality of vertices, wherein the second vertex has a second position;
   multiplying a distance between the first position and the second position by a zippering strength factor to determine a third position, wherein the third position is located in a region between the first position and the second position; and
   moving the first vertex to the third position.

4. The method of claim 3, further comprising:
   projecting the third position onto at least one of a first initial surface of the first mesh of primitives and a second initial surface of the second mesh of primitives to determine a fourth position; and
   moving the first vertex to the fourth position.

5. The method of claim 3, wherein determining the third position comprises multiplying a distance between the first position and the second position by the zippering strength factor.

6. The method of claim 1, further comprising combining a first vertex included in the first plurality of vertices and a second vertex included in the second plurality of vertices to generate a welded vertex.

7. The method of claim 1, wherein determining the intersection boundary comprises:
   determining a first portion of the first mesh of primitives that is disposed within an interior volume of the second mesh of primitives; and
   determining a second portion of the second mesh of primitives that is disposed within an interior volume of the first mesh of primitives.

8. The method of claim 1, further comprising:
   removing a third plurality of primitives included in the first mesh, wherein the third plurality of primitives is disposed within an interior volume of the second mesh of primitives; and
   removing a fourth plurality of primitives included in the second mesh, wherein the fourth plurality of primitives is disposed within an interior volume of the first mesh of primitives.

9. The method of claim 1, wherein a first graphic object comprises the first mesh of primitives and a second graphic object comprises the second mesh of primitives.

10. A non-transitory computer-readable storage medium including instructions that, when executed by a processing unit, cause the processing unit to merge intersecting meshes of primitives by performing the steps of:
    determining an intersection boundary that is defined by an intersection between a first mesh of primitives and a second mesh of primitives;
    determining that a first plurality of primitives included in the first mesh of primitives are proximate to the intersection boundary;
    determining that a second plurality of primitives included in the second mesh of primitives are proximate to the intersection boundary;
    performing a first density refinement operation to reduce a first vertex density associated with the first plurality of primitives;
    performing a second density refinement operation to increase a second vertex density associated with the second plurality of primitives, wherein, after the first density refinement operation and the second density refinement operation are performed, the first vertex density and the second vertex density are substantially equal;
    removing the first plurality of primitives to form a first mesh boundary associated with the first mesh of primitives;
    removing the second plurality of primitives to form a second mesh boundary associated with the second mesh of primitives; and
    connecting a first plurality of vertices associated with the first mesh boundary to a second plurality of vertices associated with the second mesh boundary to form a joined boundary.

11. The non-transitory computer-readable storage medium of claim 10, further comprising:
    performing a first mesh refinement pass on the first plurality of primitives to produce the first vertex density; and performing a second mesh refinement pass on the second plurality of primitives to produce the second vertex density.

12. The non-transitory computer-readable storage medium of claim 10, wherein connecting the first plurality of vertices to the second plurality of vertices comprises:
identifying a first vertex included in the first plurality of vertices and having a first position;
identifying a second vertex that is proximate to the first vertex and included in the second plurality of vertices, wherein the second vertex has a second position;
multiplying a distance between the first position and the second position by a zippering strength factor to determine a third position, wherein the third position is located in a region between the first position and the second position; and
moving the first vertex to the third position.

13. The non-transitory computer-readable storage medium of claim 12, further comprising:
projecting the third position onto at least one of a first initial surface of the first mesh of primitives and a second initial surface of the second mesh of primitives to determine a fourth position; and
moving the first vertex to the fourth position.

14. The non-transitory computer-readable storage medium of claim 12, wherein determining the third position comprises multiplying a distance between the first position and the second position by the zippering strength factor.

15. The non-transitory computer-readable storage medium of claim 10, further comprising combining a first vertex included in the first plurality of vertices and a second vertex included in the second plurality of vertices to generate a welded vertex.

16. The non-transitory computer-readable storage medium of claim 10, wherein determining the intersection boundary comprises:
determining a first portion of the first mesh of primitives that is disposed within an interior volume of the second mesh of primitives; and
determining a second portion of the second mesh of primitives that is disposed within an interior volume of the first mesh of primitives.

17. The non-transitory computer-readable storage medium of claim 10, further comprising:
removing a third plurality of primitives included in the first mesh, wherein the third plurality of primitives is disposed within an interior volume of the second mesh of primitives; and
removing a fourth plurality of primitives included in the second mesh, wherein the fourth plurality of primitives is disposed within an interior volume of the first mesh of primitives.

18. The non-transitory computer readable medium of claim 10, wherein the first mesh of primitives comprises a first closed surface, and the second mesh of primitives comprises a second closed surface.

19. The non-transitory computer readable medium of claim 10, further comprising:
projecting vertices associated with the joined boundary onto an initial surface associated with at least one of the first mesh of primitives and the second mesh of primitives; and
moving one or more of the vertices associated with the joined boundary towards the initial surface.

20. A computing device, comprising:
a memory; and
a processing unit coupled to the memory and configured to merge intersecting meshes of primitives by:
determining an intersection boundary that is defined by an intersection between a first mesh of primitives and a second mesh of primitives;
determining that a first plurality of primitives included in the first mesh of primitives are proximate to the intersection boundary;
determining that a second plurality of primitives included in the second mesh of primitives are proximate to the intersection boundary;
performing a first density refinement operation to reduce a first vertex density associated with the first plurality of primitives;
performing a second density refinement operation to increase a second vertex density associated with the second plurality of primitives, wherein, after the first density refinement operation and the second density refinement operation are performed, the first vertex density and the second vertex density are substantially equal;
removing the first plurality of primitives to form a first mesh boundary associated with the first mesh of primitives;
removing the second plurality of primitives to form a second mesh boundary associated with the second mesh of primitives; and
connecting a first plurality of vertices associated with the first mesh boundary to a second plurality of vertices associated with the second mesh boundary to form a joined boundary.

21. The computing device of claim 20, wherein connecting the first plurality of vertices to the second plurality of vertices comprises:
identifying a first vertex included in the first plurality of vertices and having a first position;
identifying a second vertex that is proximate to the first vertex and included in the second plurality of vertices, wherein the second vertex has a second position;
multiplying a distance between the first position and the second position by a zippering strength factor to determine a third position, wherein the third position is located in a region between the first position and the second position; and
moving the first vertex to the third position.

* * * * *